United States Patent [19]
Dorfman et al.

[11] Patent Number: 6,029,214
[45] Date of Patent: *Feb. 22, 2000

[54] INPUT TABLET SYSTEM WITH USER PROGRAMMABLE ABSOLUTE COORDINATE MODE AND RELATIVE COORDINATE MODE SEGMENTS

[75] Inventors: Jonathan H. Dorfman, Berkeley; Mark A. Della Bona, Los Altos, both of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,883

[22] Filed: Nov. 3, 1995

[51] Int. Cl.[7] .................................................. G06F 13/12
[52] U.S. Cl. ................................. 710/73; 710/8; 345/173
[58] Field of Search .................................. 345/146, 147, 345/173, 179, 326, 339, 340, 342; 395/893, 326, 339, 347, 500; 710/5, 8, 73; 178/18, 19, 20

[56] References Cited

U.S. PATENT DOCUMENTS

| | | | |
|---|---|---|---|
| 5,025,410 | 6/1991 | Morita | 178/18 |
| 5,402,151 | 3/1995 | Duwaer | 345/173 |
| 5,442,373 | 8/1995 | Nomura et al. | 345/173 |
| 5,491,495 | 2/1996 | Ward et al. | 345/173 |

OTHER PUBLICATIONS

"How the Trackpad Works," MacWorld Jul. 1994, p. 101.

*Primary Examiner*—Dung C. Dinh
*Attorney, Agent, or Firm*—Beyer & Weaver, LLP

[57] ABSTRACT

A computer system includes an input pointer, a tablet having a two-dimensional tablet surface, and a data processor coupled to the tablet and operative to receive coordinate data from the tablet. The coordinate data is preferably in absolute-mode, and the data processor processes the coordinate data such that coordinate data influenced by a first segment of the tablet surface is processed in a relative-mode fashion, and coordinate data influenced by a second segment of the tablet surface is processed in an absolute-mode fashion. In consequence, the tablet is segmented for simultaneous relative-mode and absolute-mode operation. The segments can take on a number of configurations depending upon the configuration of the computer screen, the application program running, and user preferences. A method for processing input tablet data of the present invention includes the steps of receiving coordinate data from a tablet having a two-dimensional tablet surface, processing the coordinate data in a relative-mode if the data is influenced by proximal positioning of an input pointer with a first segment of the tablet surface, and processing the coordinate data in an absolute-mode if the data is influenced by a proximal positioning of the input pointer with a second segment of the tablet surface. The method further detects commands to change the logical segmentation of the tablet surface, and changes the logical segmentation in response to the detected commands.

25 Claims, 12 Drawing Sheets

INPUT TABLET SYSTEM WITH USER PROGRAMMABLE ABSOLUTE COORDINATE MODE AND RELATIVE COORDINATE MODE SEGMENTS

BACKGROUND OF THE INVENTION

The present invention relates generally to computer input devices and more particularly to methods and apparatus for processing input tablet data in a computer system.

Conventional computer systems generally have three basic subsystems, including a microprocessor which contains the control logic and arithmetic unit of the computer system, a memory which holds programs and data, and an input/output (I/O) subsystem having one or more ports that connect to internal or external "peripheral" devices such as terminals, disk drives, printers, modems, etc. The three subsystems are interconnected with busses and "glue chips" to perform their designed functionality, as is well known to those skilled in the art.

A common input peripheral device is a keyboard which is used to enter alphanumeric, command, and other information into the computer system. A common output peripheral device is a video display which includes a screen having a screen capable of displaying text, graphics, and other data under the control of the computer system. Some peripheral devices act as both input and output devices. For example, a so-called "pen-based" or "personal digital assistant" ("PDA") computer system includes a dual-function display that serves as both an output display and as an input "tablet."

With the advent of computer systems having graphical user interfaces ("GUI"), the use of input "pointer" devices has become almost universal. The most common type of input pointer device is known as a "mouse", which is used to control a pointer image displayed on the screen of the video display of the computer. Other equivalent structures for a mouse include trackballs and some input "pads", as will be discussed subsequently. The pointer image typically takes the form of an arrow, although other pointer images such as a pointing hand are also used. As the mouse is moved under the control of the computer user, the pointer image on the screen of the computer is caused to move accordingly on the screen.

Generally, a movement of the pointer device in an "x,y" direction will result in a corresponding displacement of the pointer image on the video display in an "x,y" direction. The relative movements are often to scale, although they are not necessarily linearly related. For example, the speed of movement of the mouse can be used to vary the relative movement of the pointer image on the screen.

The mouse input device furthermore includes a button typically coupled to a mechanical, momentary switch which is used to communicate information to the computer system. Pressing the button is often referred to as a "click", where the act of pressing the button is often referred to as "clicking" or "clicking the mouse." A "clicking" operation is one in which the mouse button is quickly pressed and released, and is often used to "select" objects, such as icons, windows, buttons etc., displayed on the screen of the video display. A "double-clicking" operation, in which the mouse button device is pressed and released twice in rapid succession, is often used to open or activate folders or application programs. "Pressing" the mouse refers to pressing and holding the button down without releasing the button. This "pressing" operation is often used as part of a "dragging" operation where a selected icon is "dragged" across the screen with the movement of the pointer image, or as part of a pull-down menu selection process.

The computer system including a mouse input device (or equivalent) and video display output device operates in a "relative-mode mapping" fashion. "Relative-mode mapping" refers to the way in which the computer system processes input data relating to the change of position of the mouse, and the subsequent mapping of this change of position to correspond to a related change of position of the pointer image displayed on the video display screen. With relative-mode mapping, the initial position of the mouse does not matter. Instead, what matters is the change of position (i.e. the relative position) of the mouse with respect to its initial position. For example, when the mouse is lifted from a surface and placed anywhere else on the surface, the pointer image does not change position on the video screen. Any further movement of the mouse over the surface will be relative to the new initial position of the mouse, not the old position of the mouse before it was lifted from the surface (both of which correspond to the same cursor position on the screen). All common mice, trackballs, and their equivalents operate with relative-mode mapping.

In contrast to relative-mode mapping, "absolute-mode mapping" utilizes the actual x,y position of an input device to control a pointer image on the screen of the video display. With absolute-mode mapping, the peripheral input device of the computer system has a defined input surface area designed for the entry of input pointer position data. An example of an absolute-mode mapping input device is an input "tablet" which provides the computer system with the x,y coordinates of the tip of a stylus engaging its input surface area.

As briefly mentioned previously, another type of input peripheral device in a computer system is known as a "trackpad." A trackpad input device is provided, for example, on the 500-series PowerBook™ laptop computers made and marketed by Apple Computer, Inc. of Cupertino, Calif. A trackpad includes an input "pad" or "tablet" capable of sensing the position of an input pointer placed in contact with the input pad. The input pointer may take any number of forms, such as a stylus, a user's finger, etc.

The trackpad of the 500-series PowerBook™ portable computer from Apple Computer, Inc. operates with relative-mode mapping, as opposed to a conventional tablet which, as mentioned previously, operates with absolute-mode mapping. Therefore, the motion information developed by the trackpad is processed by the computer system such that the pointer image is controlled with relative-mode mapping. When the input pointer is lifted from one location on the trackpad and then re-engaged with the trackpad at another location, the pointer image displayed on the video display screen does not change in position, in a manner analogous to the operation of a mouse as described above. A mechanical button, similar to the mouse button described previously, is typically provided in close proximity to the trackpad. Therefore, a conventional trackpad is configured to operate essentially identically to the operation of a conventional mouse or similar "relative" input pointing device.

It should be noted that the cost of providing a mechanical button in conjunction with a trackpad is greater than the cost of the trackpad itself. In addition, the reliability of a mechanical button is inferior to that of a trackpad.

Furthermore, even though trackpads are mechanically and electrically similar to input tablets, trackpads of the prior art operate solely with relative-mode mapping as opposed to the absolute-mode mapping available with input tablets. This reduces the functionality of the trackpads for certain applications.

SUMMARY OF THE INVENTION

The present invention provides a trackpad or input tablet which can operate both in an absolute-mode and in a relative-mode fashion. For the convenience of discussion, a trackpad or input tablet of the present invention will be referred to as "input tablet." When the input tablet of the present invention is configured to multiple sections, the input tablet is said to be "segmented." The present invention permits segments of the input tablet to be defined by the user, by an application program, or by default.

More particularly, a computer system in accordance with the present invention includes an input pointer, a tablet having a two dimensional surface, and a data processor coupled to the tablet which operates on coordinate data produced by the tablet in a relative-mode fashion, in an absolute-mode fashion, or in a combination of relative-mode and absolute-mode fashions. Preferably, the coordinate data is provided by the tablet in absolute-mode, and the tablet is logically segmented into two or more segments, where a first segment is a relative-mode segment and the second segment is an absolute-mode segment. Since data is preferably received from both the first segment and the second segment in absolute-mode form, the data processor converts the coordinate data to relative-mode data when the data is "influenced" by the first segment. By "influenced" it is meant that the coordinate data being provided by the tablet is intended, by the user, to be processed in a relative-mode.

In one embodiment of the present invention, the first segment "influences" the coordinate data if the input pointer was first contacted within the area of the first segment and has not yet been removed from the surface of the input tablet. In another embodiment of the present invention, the first segment "influences" the coordinate data only while the input pointer is within the area of the first segment.

The segmentation of the input tablet is quite flexible and can take on any number of configurations. For example, a centrally located relative-mode segment can be at least partially surrounded by one or more absolute-mode segments. Alternatively, absolute-mode and relative-mode segments can be provided on the input tablet to "map" to various areas on the screen of the video display of the computer system. For example, one segment can map to the "desktop" displayed on the screen, while another segment can map to a "menu bar", "palette", or "tool bar" displayed on the screen. Alternatively, a segment of the of the input tablet can be mapped into a "window" displayed on the screen, or to a "button."

A special form of absolute-mode segment is a "button" segment. Button segments can be flexibly designed and can be dynamically reconfigured during the operation of the computer system. A series of button segments can be provided to emulate a key pad or keyboard of a computer system. When configured in such a mode, a flexible template can be provided to overlie the input tablet to provide visual and/or tactile feedback to the user as to the location of the button segments.

In another embodiment of the present invention, a differentiation is made as to the type of input pointer used with the input tablet. For example, a segment may be processed in one fashion when the input pointer is a finger, and in another fashion when the input pointer is a stylus. In this example, if a finger engages a particular segment of the input tablet, that engagement may be ignored or treated differently than if a stylus engages that segment.

A method for processing for input tablet data in accordance with the present invention includes the steps of receiving coordinate data from a tablet, processing the coordinate data in a relative-mode if the data is influenced by proximal positioning of the input pointer with a first segment of the tablet surface, processing the coordinate data in an absolute-mode if the data is influenced by proximal positioning of the input pointer with a second segment of the tablet surface. The step of processing the coordinate data in a relative-mode includes calculating x,y positional change data of a proximal positioning of the input pointer to a previous proximal positioning of the input pointer.

The method preferably further includes the step of detecting a command to change the logical segmentation of the tablet surface, and changing the logical segmentation in response to the command. This command may be received by system default, by a particular application program, or by an explicit user input.

A method for configuring an input tablet includes the steps of detecting a command to set a mode of a two-dimensional tablet surface of the input tablet, and changing the mode to at least one of an absolute-mode and a relative-mode in response to the command. The command can set the entire tablet surface to either the absolute-mode or the relative-mode. However, preferably the command "logically segments" the tablet surface to include at least one relative-mode segment and at least one absolute-mode segment.

An input tablet configurator includes a machine readable medium, and program instructions stored in the machine readable medium. The program instructions include the steps of detecting a command to set a mode of a tablet surface of the input tablet, and instructions for changing the mode to at least one of an absolute-mode and a relative-mode in response to the command. As before, the command can instruct that the entire tablet surface be configured as one of the absolute-mode and the relative-mode but, preferably, the command segments the tablet surface to include at least one relative-mode segment and at least one absolute-mode segment.

An advantage of the present invention is that a trackpad or input tablet can be flexibly and dynamically reconfigured into a relative-mode, an absolute-mode, or a combination of relative-mode and absolute-mode. With proper segmentation, many types and combinations of input devices (e.g. mechanical buttons, absolute tablets, relative pointing devices, etc.) can be emulated with the input tablet of the present invention.

These and other advantages of the present invention will become apparent upon reading the following detailed descriptions and studying the various figures of the drawings.

DETAILED DESCRIPTION OF THE PREFERRED EMBODIMENTS

Figure 1:
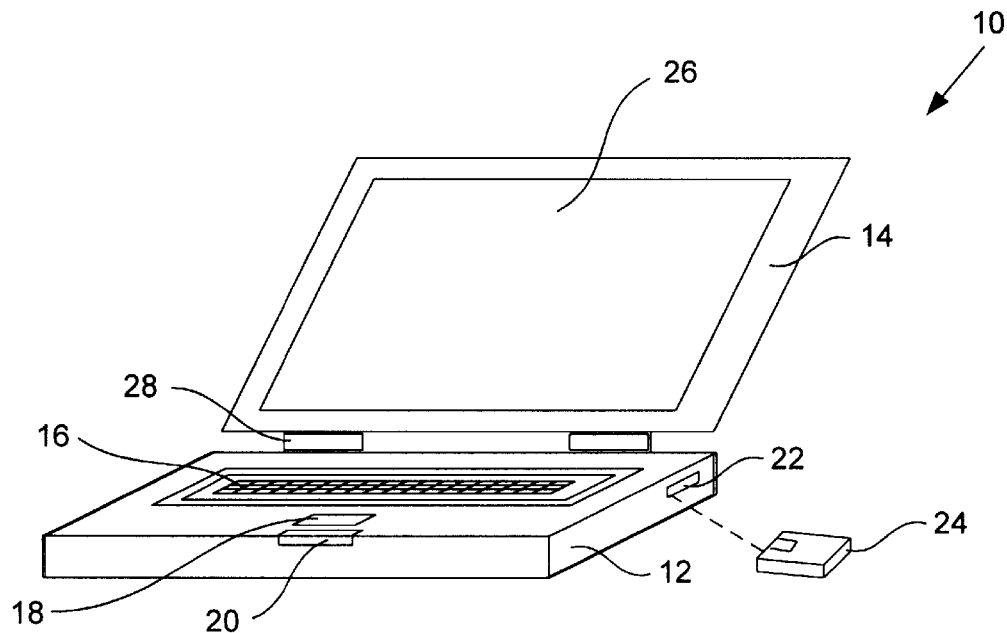
FIG. 1 is a perspective view of a computer system which implements the method and apparatus of the present invention.

In FIG. 1, a computer system 10 implementing the present invention includes a main unit 12 and a video display unit 14. The main unit 12 includes a keyboard 16, a trackpad or "input" tablet 18, a button 20, and a slot 22 receptive to a floppy disk 24. The video display unit 14 includes a display screen 26.

The main unit 12 typically encloses the majority of the operating components of the computer system 10. For example, as will be discussed in greater detail with reference to FIG. 2, the main unit 12 typically encloses the microprocessor, memory, hard disk drive, floppy disk drive, power supply, and input/output (I/O) of the computer system 10. This is a fairly standard configuration, and describes the configuration of, for example, the 500-series PowerBook laptop computer made by Apple Computer, Inc. of Cupertino, Calif. In contrast, the video display unit 14 typically includes just the screen 26 and any support circuitry for the screen 26. If the computer system 10 is a laptop or notebook type computer, the main unit 12 is typically coupled to the video display unit 14 by hinges 28 so that the computer system 10 can be closed by pivoting the main unit 12 and video display unit 14 together in a well known "clam-shell" configuration. Alternatively, the computer system 10 can be configured as a desktop computer where the main unit 12 is typically separate from the video display unit 14. When configured as a desktop unit, typically the keyboard 16, input tablet 18, and button 20 are provided separately from housing of the main unit 12.

Figure 2:
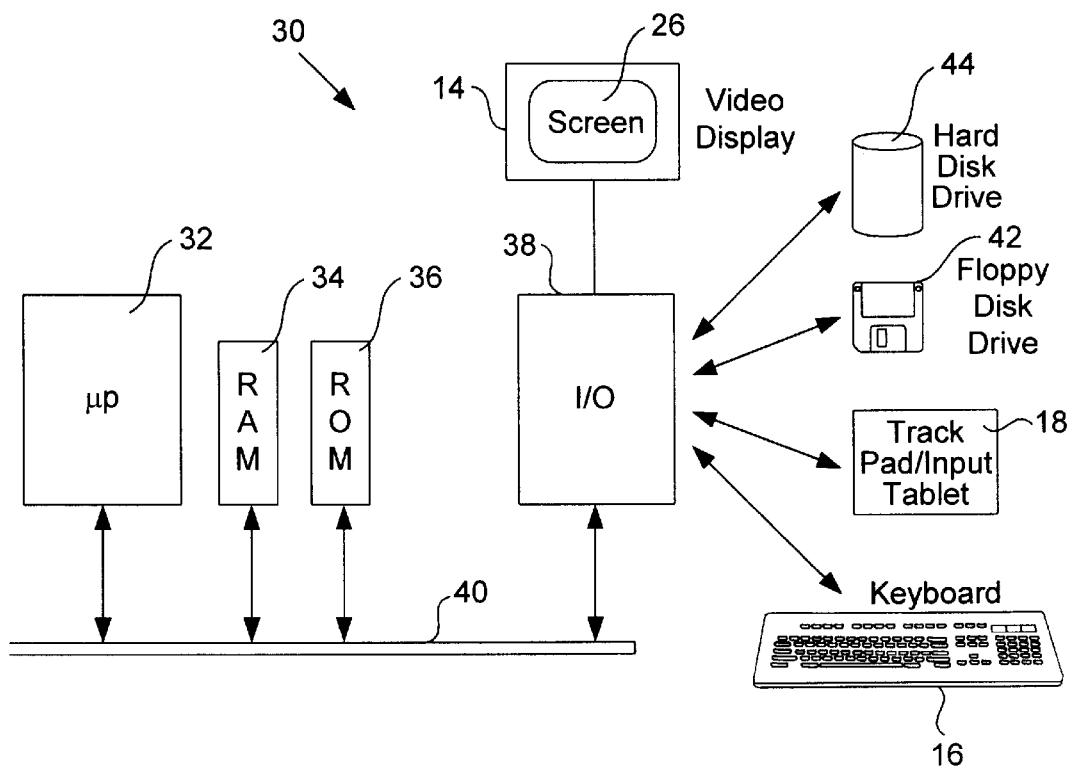
FIG. 2 is a block-diagram of the computer system of FIG. 1.

In FIG. 2, a simplified block diagram 30 of the computer system 10 is illustrated. More specifically, the block diagram 30 includes a microprocessor 32, random access memory (RAM) 34, read only memory (ROM) 36, input/output (I/O) circuitry 38. Each of the functional components of the block diagram are coupled together for communication, either directly or indirectly, via a bus 40.

As will be appreciated by those skilled in the art, the bus 40 carries data (D), address (A), and control (C) information between the various functional components of the computer system. The bus 40 is shown somewhat schematically, in that there is typically a hierarchy of buses in a computer system 10 including a CPU or "local" bus, a memory bus, and an I/O bus. However, such design details are well known to those skilled in the art, and will not be discussed herein for that reason.

The block diagram 30 of the computer system 10 further includes a video display unit 14 (including the screen 26), the keyboard 16, the input tablet 18, a floppy disk drive 42, and a hard disk drive 44. An important aspect of the present invention is the manner in which the input tablet 18, the I/O 38, the microprocessor 32, and the video display 14 interact to provide absolute-mode, relative-mode, and combination absolute-mode/relative-mode operation of the input tablet 18.

The microprocessor 32 can be any one of a number of commercially available microprocessors, such as the PowerPC™ microprocessor available from Motorola, Inc. RAM 34 is typically volatile memory such as dynamic random access memory (DRAM), and is used as temporary or "scratch pad" memory. ROM 36, on the other hand, is a non-volatile or permanent memory, and typically includes portions of the main operating system for the computer system 10. I/O 38, shown here as a single functional block, is actually a number of specialized input and/or output circuits designed to interface peripherals such as video display 14, keyboard 16, input tablet 18, floppy disk drive 42, and hard disk drive 44 to the bus 40.

The input tablet 18 is, in one preferred embodiment, the trackpad of a PowerBook computer system manufactured and sold by Apple Computer, Inc. The trackpad uses capacitance sensing, similar to the touch sensitive buttons in a modern elevator. However, instead of using an elevator button's single sensor, the trackpad has a number of conductive strips. Controlling circuits generate high-frequency signals along the strips and sense changes in the electrical field for the strips. The electrical field emanates through and above the surface of the pad. Placing an input pointer (such as a finger tip) on the trackpad surface disrupts the electrical field for several of the conductive strips. Software and hardware calculate the center of the disturbance to provide a coordinate point to the microprocessor 32.

By scanning the strips rapidly, the trackpad circuitry can follow the movement and speed of the finger. The trackpad used for the 500-Series PowerBooks can detect 387 points ("pixels") per inch. A detailed description of the construction and operation of a trackpad for a 500-Series PowerBook can be found in the MacWorld magazine dated July 1994, pp. 101.

Of course, input tablets 18 based on other technologies can also be used with the present invention. For example, resistive-membrane type input tablets, radio signal-coupled input tablets, etc. can be used with the present invention.

Figure 3:
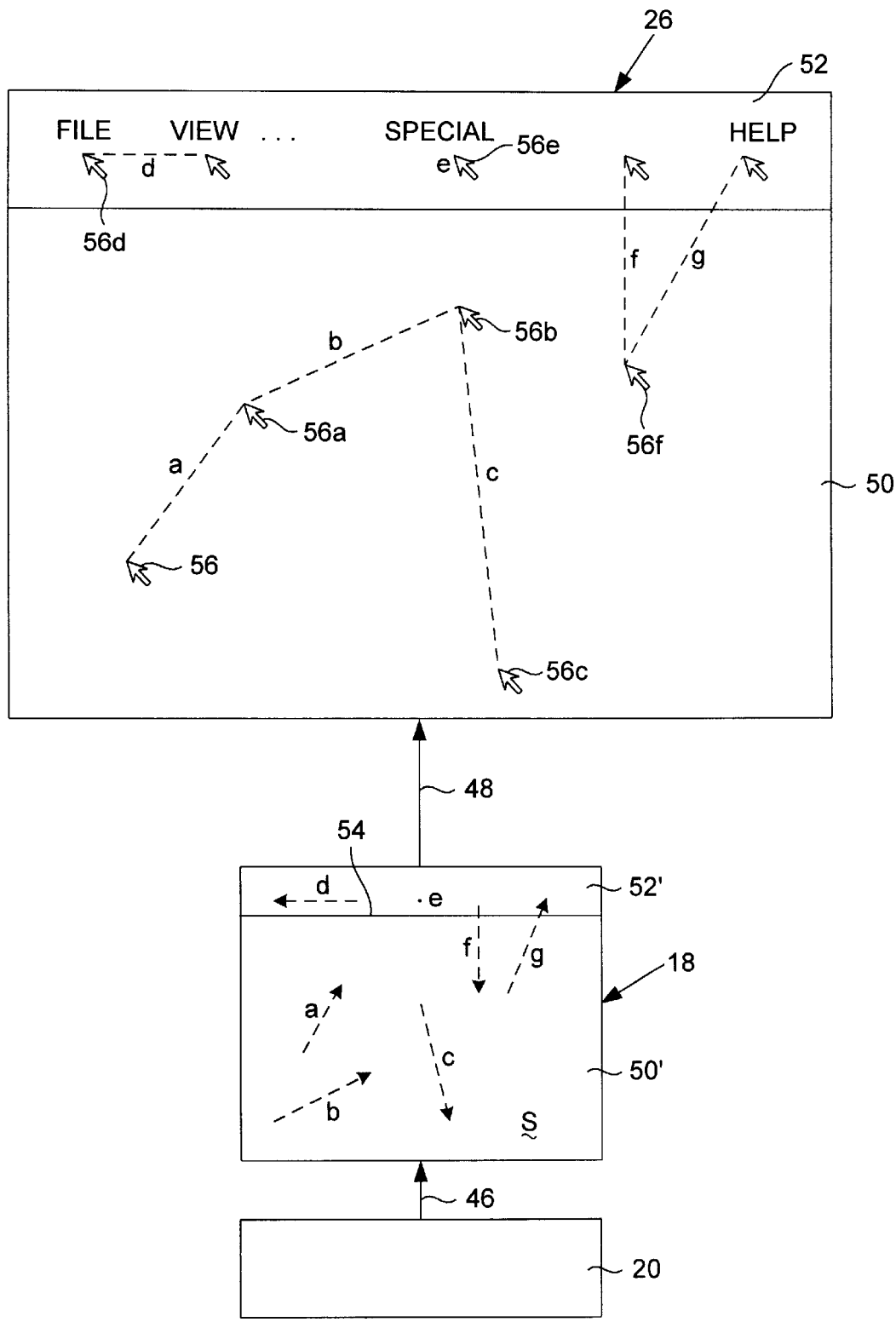
FIG. 3 is an illustration of the computer screen, input tablet, and button of the present invention.

FIG. 3 will be used to discuss some of the concepts of the present invention. In FIG. 3, the input tablet 18, button 20, and screen 26 are shown in a simplified or "schematic" form. The arrow 46 between the button 20 and input tablet 18 indicates that the button 20 creates an input to the computer system 10 that is dependent upon the input tablet 18, and the arrow 48 between the input tablet 18 and the screen 26 indicate that actions made on the input tablet 18 affect the display of images on the screen 26. However, as mentioned previously, this illustration of FIG. 3 is more theoretical than literal in nature and is used herein to provide a context for the high-level concepts of the present invention.

Often, the image on a screen 26 is divided into a number of areas. In computer systems using graphical user interfaces (GUI), the image on a computer screen 26 is often divided into a "desktop" area 50 and a "menu bar" area 52. For the purpose of this example, the input tablet 18 has been "segmented" into a logical segment 50' corresponding to the desktop 50 and into a logical segment 52' corresponding to the menu bar area 52.

As used herein, "segment" is a logical construct which assigns characters or attributes to a particular area or portion of the surface of the tablet 18. Visually, the segments or segmentation of an input tablet may not be discernible to the end user, either visually, tactilely, or in any other fashion unless such visual, tactile, etc. feedback has been added to the surface of the tablet. For example, it is possible to provide an overlying template to provide such visual feedback of the "logical" segmentation of the input tablet 18. However, for the purpose of this example, it will be assumed that the segment 50' and the segment 52' are not visually, tactilely, or otherwise discernible to the user, i.e. the demarcation line 54 is purely imaginary.

The following discussion will be used to help illustrate the "relative-mode," "absolute-mode," and the concept of segmentation of an input tablet. We will assume herein that the segment 50' is a "relative-mode," segment while the segment 52' is an absolute-mode segment. By "relative-mode," it is meant that a cursor image on screen 26 moves in relation to the relative movement of an input pointer on input tablet 18. In contrast, in "absolute-mode," a cursor image on screen 26 moves to a point on screen 26 which corresponds to a corresponding point on the input tablet 18.

As mentioned previously, in the present example it will be assumed that the segment 50' corresponding to the desktop 50 of screen 26 is in the relative-mode while the segment 52' corresponding to the menu bar 54 is in an absolute-mode. However, these two modes could equally well be reversed, based on user preference or system design. In the context of this example, when an input pointer moves as indicated by arrow "a" across the surface S of the input tablet 18, a cursor image (such as cursor image 56) will move a corresponding distance and direction along the desktop 50 of screen 26. It should be noted, however, that this "corresponding distance and direction" may be scaled or rotated depending upon the relative sizes and orientations of the input tablet 18 and the screen 26. Furthermore, in relative-mode applications, acceleration of the pointer can be taken into account in the movement of the cursor. For example, if the pointer is accelerating rapidly, the cursor can be moved further on the screen for a given pointer movement than if the pointer is accelerating more slowly.

Next, the input pointer is lifted from the input tablet 18, placed down on the input tablet 18 in a new position, and moved as indicated by arrow b. However, since the segment 50' is in the relative-mode, the movement of the cursor 56 will move as indicated by arrow b on the desktop 50 to a new position 56b. Likewise, when the input pointer is again lifted from the input tablet 18 and then moved as indicated by arrow c in the segment 50', the cursor 56 moves as indicated in arrow c to a new position at 56c.

Assume that the user then lifts the input pointer from the input tablet 18 and moves it within segment 52' as indicated by the arrow d. Since the segment 52' is in the absolute-mode, this will cause the pointer image to jump into the menu bar 52 of screen 26 and move as indicated by arrow d to a new position 56d. If the input pointer is then lifted from the input tablet 18 and placed at point e, the cursor will jump to point e as indicated at 56e. Again, this is a function of being in the absolute-mode, rather than in the relative-mode.

Assume next that the user lifts the input pointer from the tablet 18 surface S and moves it across the surface S as indicated by the arrow f. This will cause the input pointer to move from an absolute-mode segment 52' to a-relative-mode segment 50'. This causes the cursor 56 to move to the new position 56f on the desktop 50. If the input pointer is then lifted again from the surface S of the input tablet 18, and moved as indicated by arrow g, the cursor 56 will then move from the position 56f to the menu bar area 52.

Therefore, it is apparent that with a segmented input tablet, it is possible to process the coordinates provided by an input tablet 18 in a variety of fashions. More particularly, movements of a input pointer entirely within a relative-mode segment will be treated entirely as relative-mode, movements entirely within an absolute-mode segment will be treated entirely in absolute-mode, and movements beginning in an absolute-mode segment and moving into a relative-mode (or vice versa) are operated on a hybrid fashion. At any point in the process, the button 20 can be activated to cause an action indicated by the current location of the cursor image 56 on the screen 26.

Figure 4:
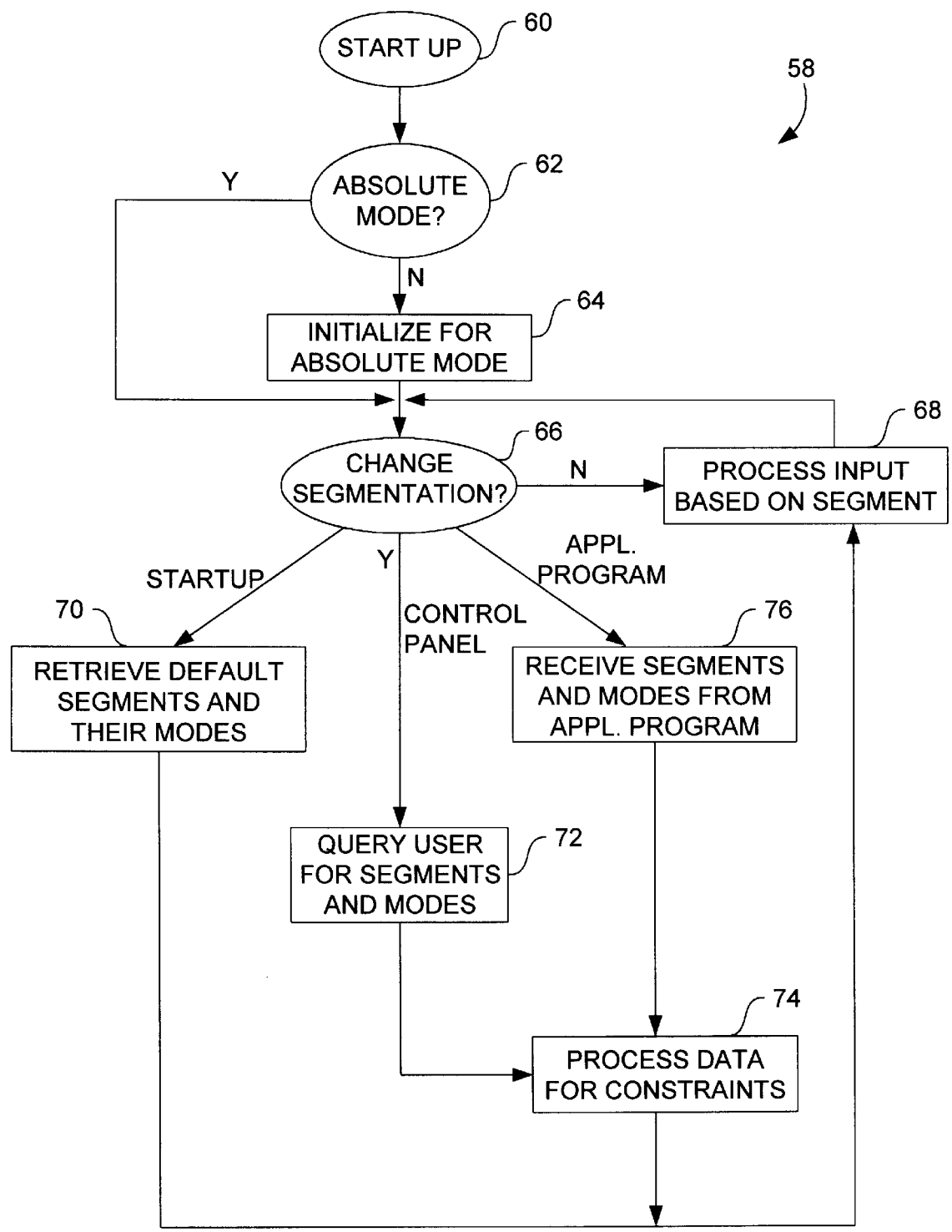
FIG. 4 is a flow-diagram illustrating the process for segmenting an input tablet in accordance with the present invention.

In FIG. 4, a process 58 for segmenting an input tablet in accordance with the present invention is disclosed. More specifically, the process 60 begins on the start-up of the computer system 10 and, in a step 62, it is determined whether the coordinate data from the input pad is absolute-mode coordinate data. This is because some input tablets provide, by default, relative-mode coordinate data while other input tablets provide, by default, absolute-mode coordinate data. If the input tablet does not default to the absolute-mode as detected by step 62, step 64 will initialize the input pad for absolute-mode.

In the description of the present invention, relative-mode coordinates will take the form of $\{\Delta x, \Delta y, \Delta z\}$, while absolute-mode coordinates will take the form of $\{x, y, z, t\}$. The $\Delta x$, $\Delta y$ and x, y parameters are typically simple Cartesian coordinates measured in "device pixels" while the $\Delta z$ and z coordinates refer either to the distance between the input pointer and the input tablet or, more commonly, to the pressure or area of contact on the tablet, as measured in units that are typically arbitrary and dependent upon the type of tablet utilized. The t parameter is "cyclical" coordinate value that can be used to distinguish simultaneous position data and temporally contiguous data. By "cyclical" it is meant that there is a progressive "time" sequence as measured by some unit (which can be arbitrary) that will increase from an initial value to a final value within a given cycle before returning to the initial value for a subsequent cycle.

With continuing reference to FIG. 4, a step 66 determines whether there is a command to change the segmentation of an input tablet. If not, a step 68 processes input from the tablet based upon the segment. Process control then returns to step 66 to determine if there is any further change in segmentation.

If step 66 determines that there is a change in segmentation, the process branches depending upon the context of the change. For example, on the start-up of the computer system 10, a step 70 retrieves default segments and their modes as stored in the memory of the computer system. These default segments and their modes can be stored in ROM 36 or on the hard drive 44 of the computer system 10. Process control is then turned over to step 68. If, however, the change in segmentation is made via a "control panel," a different branch is taken. As it is well-known to Macintosh computer users, a control panel is a utility which allows a user to modify or enhance a function or process running on the computer system 10. Macintosh computers are made by the aforementioned Apple Computer, Inc. of Cupertino, Calif.

If step 66 determines there is a change in segmentation based upon a control panel, a step 72 queries the user for segments and modes of operation. A step 74 then processes the data for constraints, and process control is returned to step 68.

Finally, if step 66 determines that the change in segmentation is due to an application program, a step 76 receives segments and their modes of operation from the application program. These segments and modes of operation are then processed for constraints in step 74 and, once again, process control is returned to step 68. It should be noted that an application program may modify some segments and leave other default segments intact in these steps.

Figure 5:
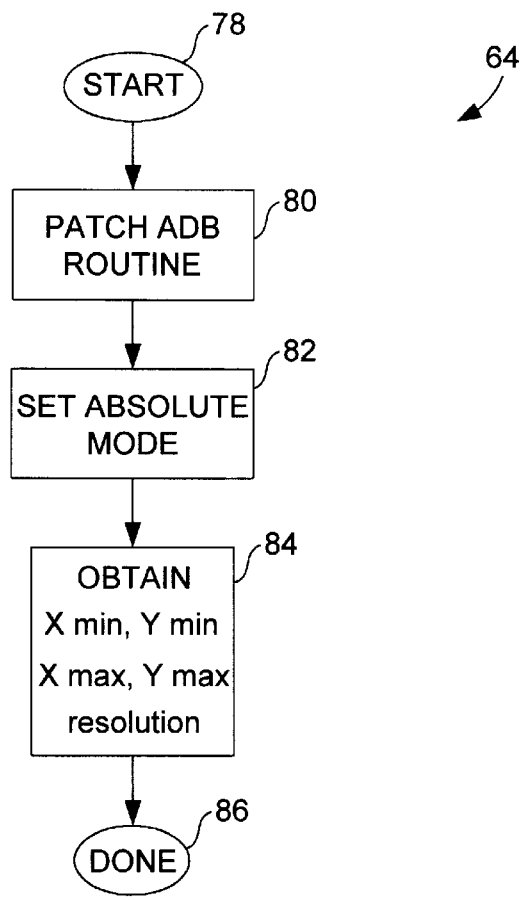
FIG. 5 is a flow-diagram illustrating the "INITIALIZE INPUT PAD FOR ABSOLUTE-MODE" step of FIG. 4.

FIG. 5 is a flow-diagram illustrating the method of step 64 of FIG. 4 in greater detail. More particularly, the process 64 begins at 78 and in a step 80, the "ADB" routine is patched. As it is well known to those familiar with the aforementioned Macintosh computer systems, the ADB routine handles I/O with the keyboard and pointers of the computer system. By "patching," the ADB routine, it is meant that a system patch is provided by means of the Macintosh operating system "patch table" to override the default ADB routine and to supplement or augment the default ADB routine with an ADB routine consistent with the present invention. The process for making and using system patches for Macintosh computer system is well documented in the book *Inside Macintosh—Devices,* published by Addison-Wesley, Inc.

Once the ADB routine has been patched in step 80, the input tablet is set to the absolute-mode. This is easily accomplished once the ADB routine has been patched by simply sending a command to the input tablet to provide coordinates in absolute-mode. Next, a query is made to the input tablet to obtain the coordinates of the corners of the tablet and to obtain the resolution of the tablet. More specifically, step 84 determines the upper left hand corner $\{x_{min}, y_{min}\}$, and the lower right hand corner $\{x_{max}, y_{max}\}$, along with the resolution of the tablet. It should be noted that with Macintosh computer systems, by convention x values increase from left to right in the horizontal direction and y values increase from top to bottom in the vertical direction. The process is then completed as indicated at 86.

In FIGS. 6a–6f, various segmentation configurations are illustrated. Again, these are "logical segmentations" and not necessarily visually discernible segmentations as illustrated. These are presented by way of example, and there are many other configurations that are possible, as it will be apparent in those skilled in the art upon a study of these and other figures of the drawings.

Figure 6A:
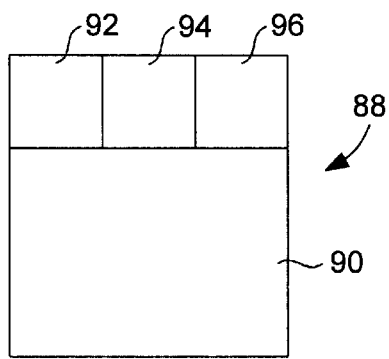
FIGS. 6a–6f illustrate a number of different segmentation techniques in accordance with the present invention.

In FIG. 6a, an input tablet 88 is segmented with a large segment 90 and three smaller segments 92, 94, and 96. The segment 90, for example, can be a relative-mode segment (mapping to the entire screen 26, see FIG. 3), while segments 92, 94, and 96 can be three, separate absolute-mode segments. These absolute-mode segments 92, 94, and 96 can be interpreted by the computer system 10 as "buttons" and, as a consequence, the tablet 88 is segmented or configured to serve as or replace a conventional three-button mouse. More particularly, the movement of a pointer across segment 90 (operating in a relative-mode) emulates the movement of a mouse over a surface, and tapping on the segments 92–96 (operating as three "buttons") emulates the mechanical buttons of a three button mouse.

Configuring a tablet 88 as illustrated in FIG. 6a can have several advantages over a conventional mouse. For one, there are no moving parts so that the durability of the tablet 88 will be much greater than that of a mechanical mouse. In particular, the segments 92–96 which emulate "buttons" of a mouse will tend to be much more reliable than the equivalent mechanical switches used in a conventional mechanical mouse. Overall, the tablet 88 is less expensive than a conventional mechanical mouse.

Figure 6B:
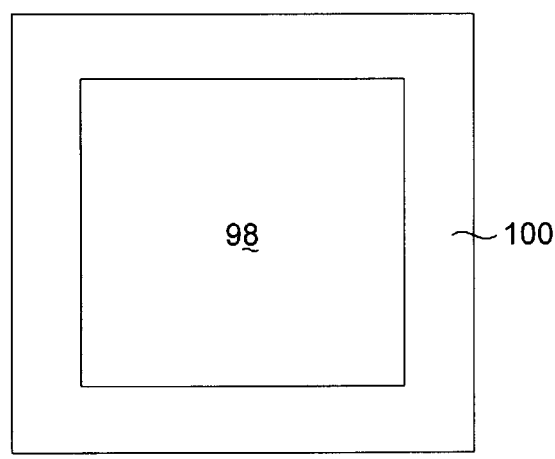

An alternate tablet segmentation 98 is illustrated in FIG. 6b. In this illustration, a central segment 98 is substantially surrounded by a perimeter segment 100. A central segment 98 can, for example, be a relative-mode segment (in a similar way described relative to segment 90 of FIG. 6a), while the surrounding segment can be an absolute-mode segment. This configuration is well adapted to GUI-type interfaces where menu bars and icons tend to be clustered around the perimeter of the screen. It is easier and more intuitive to activate an icon or a pull-down menu with an absolute-mode pointer image than it is with a relative-mode pointer image. However, it tends to be more intuitive to perform operations near the center of the screen in a relative-mode. Furthermore, if segment 100 is used to emulate the single button of a 1-button mouse, it offers the advantage of being activated with any free finger.

Figure 6C:
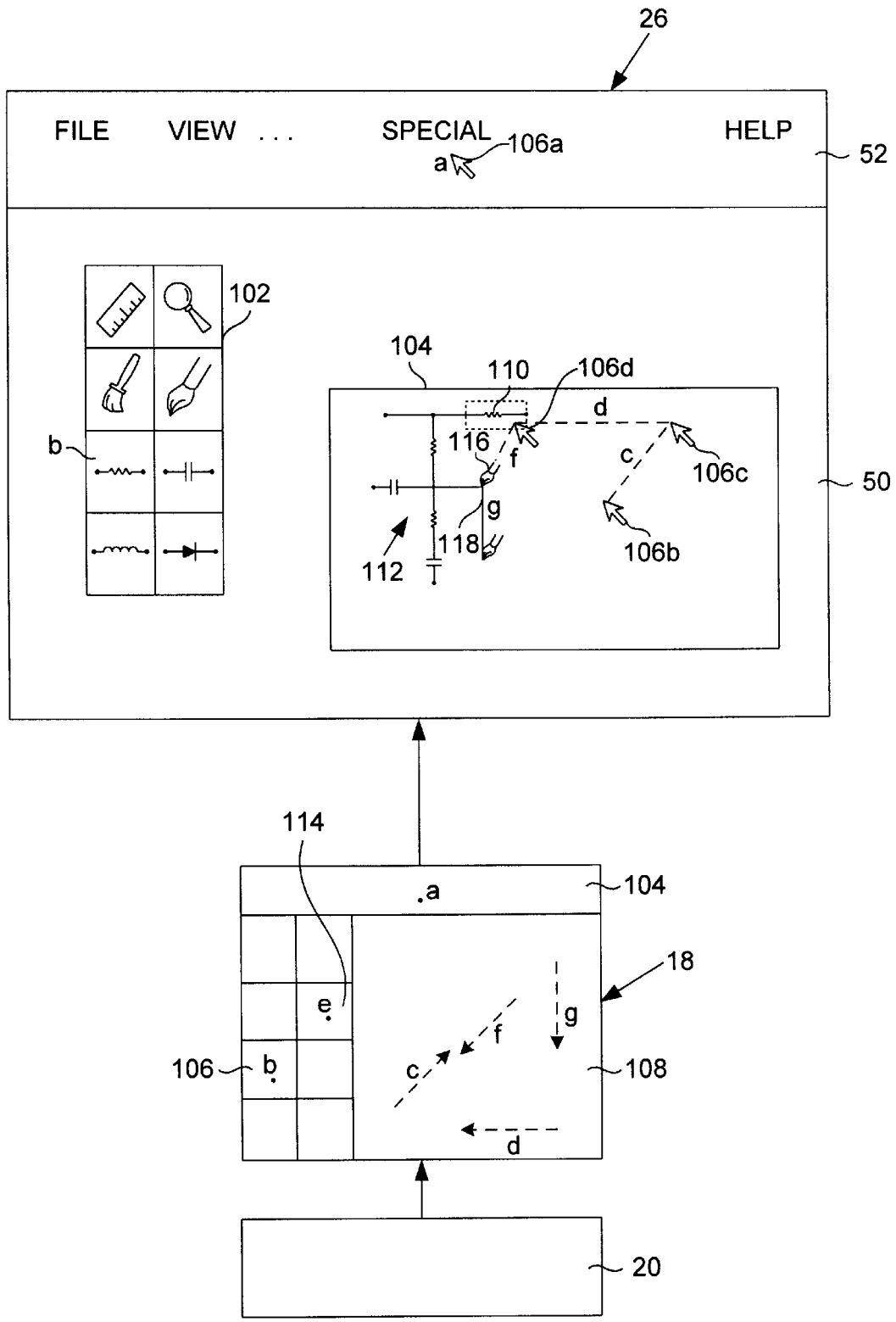

In FIG. 6c, an input tablet 18, a button 20, and a screen 26 are again illustrated. In this instance, the screen 18 has been segmented into a number of relative-mode and absolute-mode regions. It should be noted that there need not be a 1-to-1 correspondence between the segmentation of the input tablet 18 and the image areas on the screen 26. More particularly, the image area on the screen 26 includes a desktop 50 (as before) and a menu bar 52 (as before), but it also includes a floating palette 102 and window 104 of a hypothetical "drafting" application program.

In the present example, the input pointer is first contacted with the input tablet 18 in a segment 104 that is preferably in absolute-mode at a point labeled "a." This will position a pointer image at a point 106a. Next, the input pointer is engaged at a point b on the input tablet 18 within an absolute-mode segment 106. This selects a resistor icon, as illustrated, assuming the cursor is positioned on the screen at position 106b. Next, the input pointer is engaged with the input tablet 18 within a relative-mode 108 and moved as indicated by the arrow c. This causes a movement of the pointer as indicated at 106c. Next, the input pointer is lifted from the input tablet 18 and moved as indicated by arrow d on the input tablet 18, causing a corresponding relative-mode movement to put the pointer image at 106d. At this point, the button 20 can be pushed to drop the image of a resistor 110 in position on a schematic 112 within the window 104.

Next, in the current example, a "pen" tool is selected by engaging the input pointer with segment 114 of the input table 18. The segment 114 is in absolute-mode. Next, the input pointer is moved within relative-mode segment 108 as indicated by the arrow f to cause a corresponding movement of the pen tool 116 within the window 104 of the screen 26. Finally, the button 20 is pressed while simultaneously moving the input pointer within segment 108 as indicated by arrow g to cause a line 118 to be added to the schematic 112 as seen by the corresponding line g.

Figure 6D:
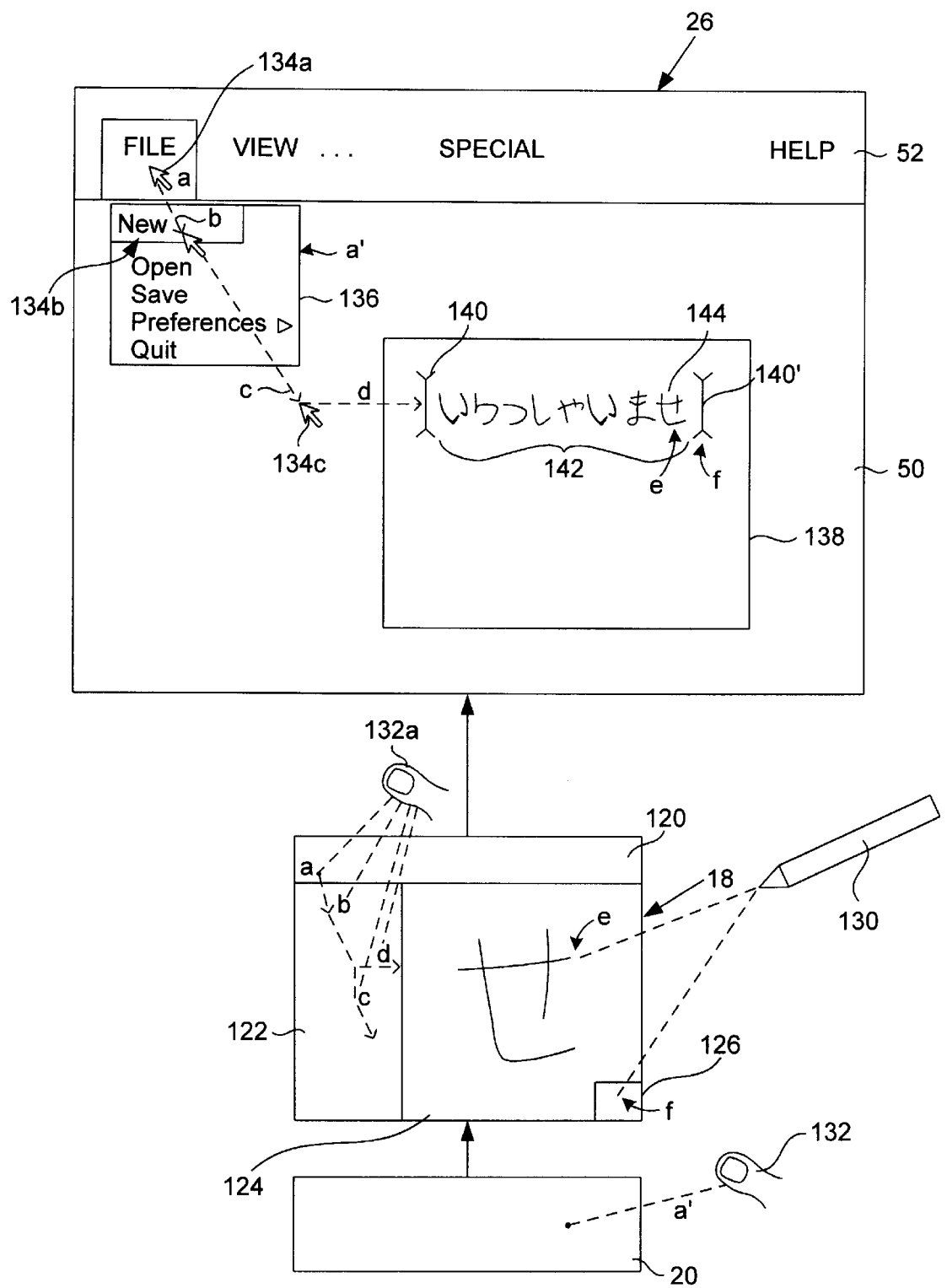

FIG. 6d illustrates yet another segmentation technique for an input tablet 18 of the present invention. In this embodiment, the tablet 18 has been segmented with an absolute-mode segment 120, a relative-mode segment 122, an absolute-mode segment 124, and yet another absolute-mode or "button" segment 126. This FIG. 6d also illustrates two types of input pointers, namely a stylus 130 and a finger tip 132.

With continuing reference to FIG. 6d, when the finger tip, as illustrated at 132a, engages point a of the segment 120, a corresponding pointer image 134a selects the "FILE" pull-down menu. The pull-down menu 136 is opened when another finger tip presses the button 20 as indicated at a' on FIG. 6d. The finger tip as indicated at 132a is then moved to a position b to cause the pointer image to move to 134b, selecting the "NEW" selection under the pull down menu 136. The finger tip 132 is then lifted from the input tablet 18, "releasing" button 20 to cause a new file to open a window 138 to be used, in this example, for the entry of Japanese characters. The Japanese characters are preferably entered by means of the stylus 130 in segment 124. This is because it is very difficult to enter handwritten characters in a relative-mode segment, so an absolute-mode segment is chosen instead.

Next, the finger 132*a* moves within segment 122 as indicated by the arrow c to cause a corresponding movement of the pointer image 134*c*. Then, another relative movement of the cursor is made by moving the finger 132*a* as indicated by the arrow d within the relative-mode segment 122 to position a cursor 140 within the window 138. Alternatively, the finger can go down on segment 124 to move cursor into window 138.

It will be assumed that Japanese characters 142 are entered sequentially by drawing the characters within the absolute-mode segment 124 of the input tablet 18. With reference to character e, the stylus 130 is used to draw the character e within the relative-mode segment 124 of the input tablet 18. When the character e is completed, the button area 126 is contacted with a tip of stylus 130 to indicate the completion of the character drawn at 144 within the window 138, and then the cursor moves to a location 140', as illustrated, to await the input of another character.

Figure 6E:
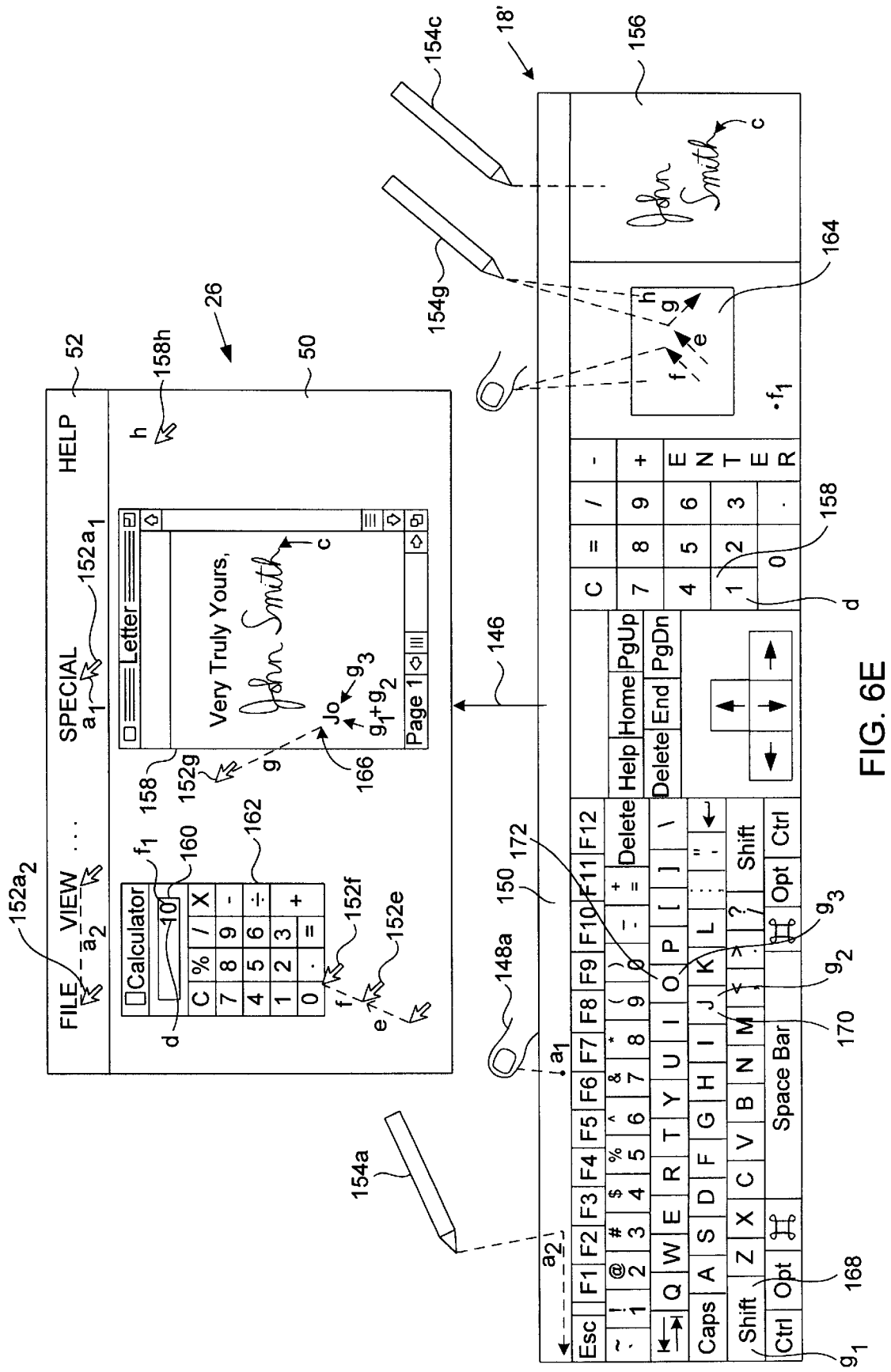

A more complex segmented input tablet in accordance with the present invention is illustrated with respect to FIG. 6*e*. More particularly, an input tablet 18' controls the image on a screen 26 as indicated by the arrow 146. The input tablet 18' is elongated and serves the function of a keyboard, a keypad, a drawing area, and a writing input area. Preferably, a template is provided to indicated that lines of demarcation of the logical segmentation due to the complexity of the segmentation. It will be appreciated that the following discussion is by way of an example, and there are many ways to implement similar or equivalent functionality using the segmentation processes of the present invention.

In FIG. 6*e*, a finger 148*a* (which, as before, is a form of input pointer) is engaged with an absolute-mode segment 150. This will position a pointer image 152*a*$_1$ on the screen 26 within a menu bar 52. Likewise, a stylus 154*a* can be engaged with segment 150 and moved as indicated by arrow a$_2$ to cause a corresponding movement in menu bar 52, leaving the pointer image at 152*a*$_2$. Next, the stylus at 154*c* is engaged with a segment 156 that is absolute-mode. This mode is well adapted for the entry of handwritten notation as indicated at c both within segment 156 and also within a window 158 on screen 52. Next, a finger or stylus (not shown) can be contacted with a segment 158 to cause the number "1" to be entered into a window 160 of a calculator 162 displayed on the desktop 50 of the screen 26.

Next, in this example, a finger can be used within a segment 164 to make two strokes as indicated by arrow e and f. As noted within the desktop 50 of screen 26, this causes the cursor to move to a position 152*e* and 152*f* in a relative-mode. However, when a stylus 154*g* is engaged with the same segment 164, the segment 164 is treated as if it is an absolute-mode segment. More particularly, the movement of the stylus 154*g* within segment 164 as indicated by arrow g will convert a pointer image 152*g* into a cursor image 166 allowing absolute-mode segment 168, 170, and 172 to be contacted. More particularly, segment 168 and 170 are activated substantially simultaneously to provide a capital "J," and the segment 172 is contacted either by a finger or stylus, to provide the lower-case "o." The stylus 154*g* is then engaged at point h which, in a absolute-mode fashion moves the pointer image 158*h* to the edge of the screen as illustrated.

This example of FIG. 6*e* illustrates several interesting concepts. For one, it introduces the concept that the way that a segment is treated can be dependent upon the type of pointer used. More particularly, the segment 164 operates in a relative-mode when a finger contacts the tablet 18' within its perimeter, and operates in an absolute-mode when a stylus contacts the surface of tablet 18' within its perimeter.

It is a straightforward task to determine whether a finger or a stylus is contacting the tablet surface because a stylus will activate much fewer "pixels" of the input tablet than a corresponding finger tip. Furthermore, the pressure exerted on the pixels activated by a stylus tends to be higher than the pressure exerted by the much softer and larger pad of the finger tip. In either case, a finger and a stylus will produce two clearly different electrical "profiles", which allows them to be easily differentiated. Therefore, as will be well appreciated by those skilled in the art, it is a relatively straightforward task to program the computer system 10 to differentiate between the types of input pointers used.

Another interesting feature illustrated by this example of FIG. 6*e* is that two or more input pointers can be used simultaneously. This was illustrated when the segment 168 and the segment 170 were activated simultaneously in order to provide a capital "J." A method for handling the simultaneous presence of multiple input pointers in accordance with the present invention will be discussed subsequently.

Figure 6F:
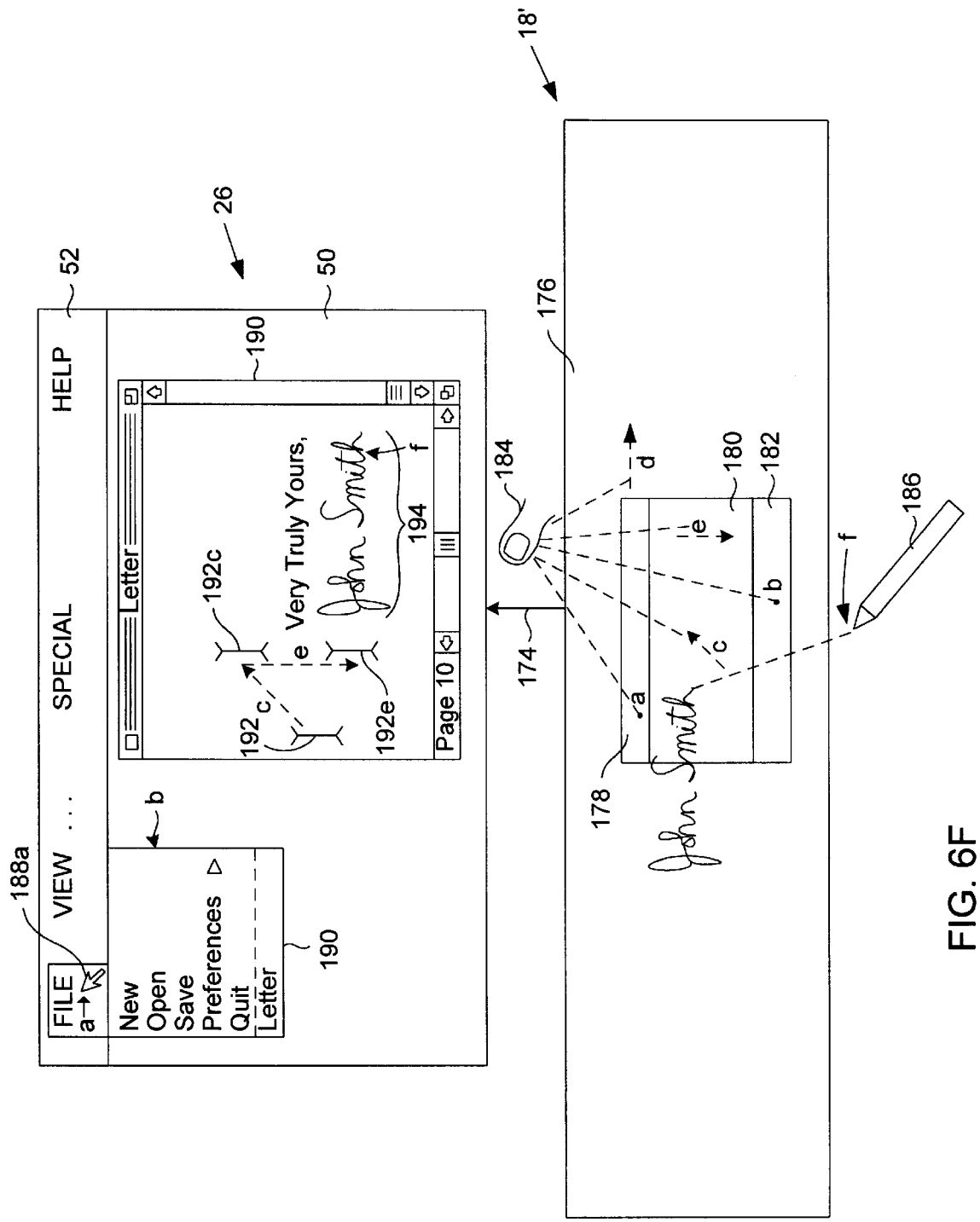

A final example of a computer system including an input tablet is illustrated in FIG. 6*f*. In this instance, an input tablet 18' controls the image on a screen 26 as indicated by arrow 174. The screen 26 has a desktop 50 and a menu bar 52 as described previously. However, in this example, the input tablet 18' includes a large segment 176 surrounding three smaller segments 178, 180, and 182. The large segment 176, as will be discussed subsequently, can serve as a passive "palm rest. Again, two types of input pointers are used, namely a finger 184 and a stylus 186.

In the example of FIG. 6*f*, assume that the finger 184 engages point a of segment 178 of the input table 18'. The segment 178 is preferably an absolute-mode segment and causes a pointer image 188*a* on the screen 26. Next, the finger engages point b in segment 182, which is operating as a "button" in absolute-mode. This causes the pull down menu 190 to open on the screen 26. Next, assume that the "New" file option has been selected to create a window 190 on a desktop 50. Subsequently, finger 184 can move as indicated by arrow c to move a cursor in a relative-mode from a position 192 to a position 192*c*. Next, if finger 184 makes the movement indicated by the arrow d in segment 176, this movement is ignored. In other words, the "palm rest" segment 176 does not recognize a finger or the like to be an input pointer while segment 178, 180, and 182 do recognize finger 184 as an input pointer. Next, if finger 184 moves as indicated by arrow e in segment 180, the cursor moves as indicated at 192*e*.

To further this example, stylus 186 is used as indicated by f to start writing the name "John Smith." It should be noted that the beginning of this name, i.e. "John S," is made within segment 176. This is recognized by the computer system 10 since section 176 can recognize a stylus 186, while it selectively ignores inputs from a finger 184. The handwriting or signature step f continues with "Smith" extending into segment 180. However, segment 180 recognizes the stylus 186 in an absolute-mode, rather than a relative-mode allowing the continuation of the signature to produce the signature as illustrated at 194 within window 190.

The example of FIG. 6*f* illustrates another interesting feature of the present invention in that not only can a given input pointer be treated in different ways within a segment, but also different types of input pointers can be treated differently within a given segment. This can be useful as in the example of FIG. 6f where accidental hand or finger pressure within segment 176 would tend to be disruptive if it was interpreted as an input pointer data. In contrast, the use of stylus 186 is more deliberate and, therefore, input within segment 176 by stylus 186 are permitted.

Figure 7:
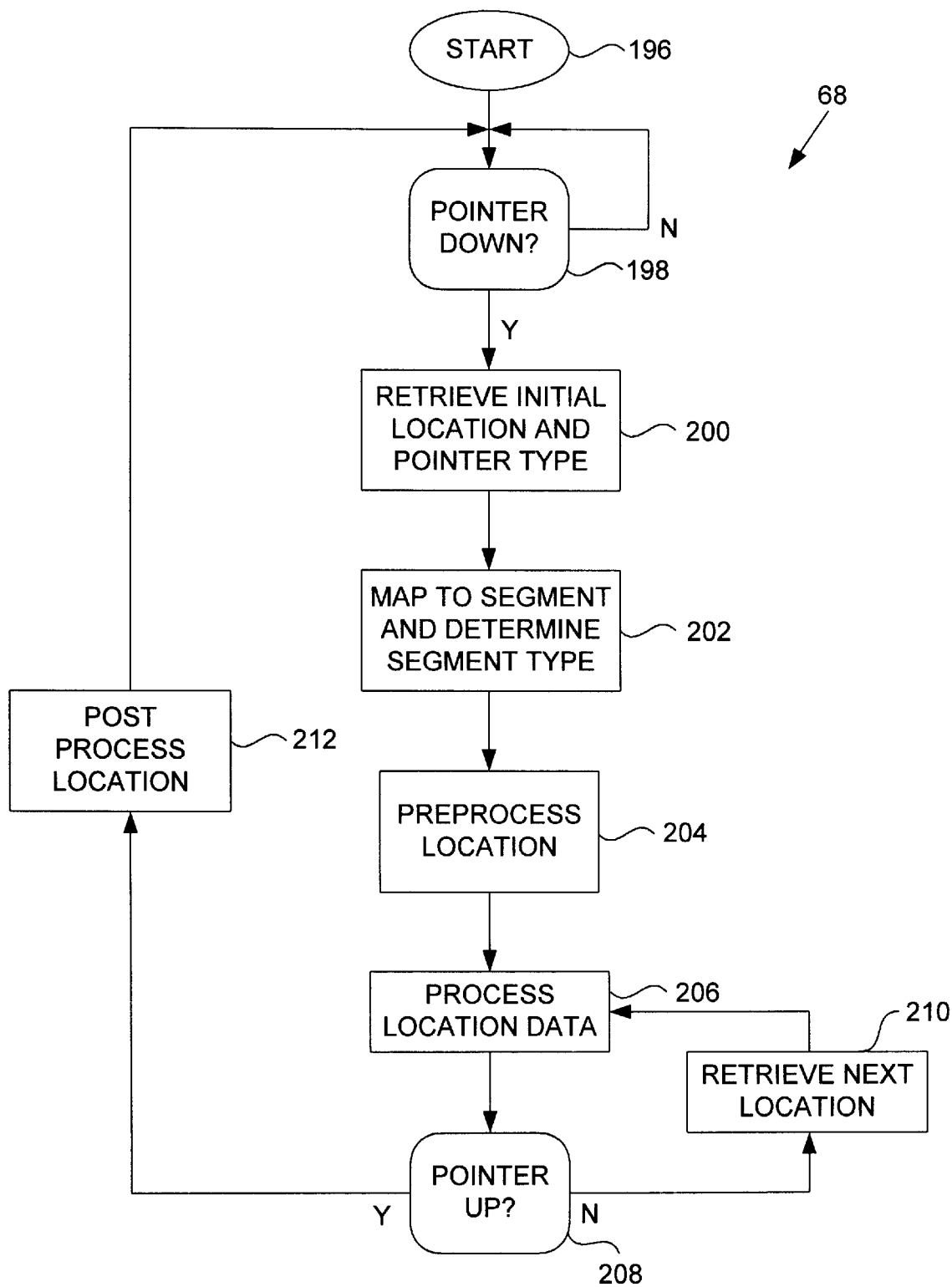
FIG. 7 is a flow-diagram of the "PROCESS BASED ON SEGMENTS" step of FIG. 4.

In FIG. 7, the process of step 68 of FIG. 4 is illustrated in greater detail. More particularly, process 68 begins at 196 and, in a decision step 198, it is determined whether the input pointer is down. If not, step 198 goes into an idle loop waiting for the pointer to be placed upon the surface of the input tablet.

Once step 198 detects that the input pointer is "down", a step 200 retrieves the initial location (x,y,z) and pointer type from the system. This pointer type information is preferably provided by the tablet in the form of a Boolean bit, a flag, or the like. For example, the high bit of the z parameter can be set by the tablet to "1" if the pointer type is "stylus", and can be set to "0" by the tablet if it is a "finger." As noted, it is a straightforward matter for a tablet to differentiate between a stylus and a finger using distinctive characteristics or "electronic profiles" of the two types of pointers. Next, in a step 202, the information concerning the absolute location and pointer type is "mapped" to a particular segment, and a determination of segment type is made. This "mapping" is a relatively straight-forward process wherein the location of the pointer is determined and is algorithmically compared to a representation of the tablet surface to determine which segment it is in and based upon pointer type, what the segment type is to be. Such mapping techniques are well known to those skilled in the art. Next, in a step 204, the location is pre-processed. Subsequently, the location data is processed in a step 206 and, in a decision step 208, it is determined whether the input pointer is "up" i.e. whether it has been lifted from the surface of the input tablet. If not, the next location is retrieved in a step 210, and process control is returned to step 206. The steps 206, 208, and 210 are repeated until the pointer is determined to be up, at which time process control is turned over to step 212 to post-process the location. After step 212, process control is returned to step 198 to await the next input pointer down state.

Figure 8:
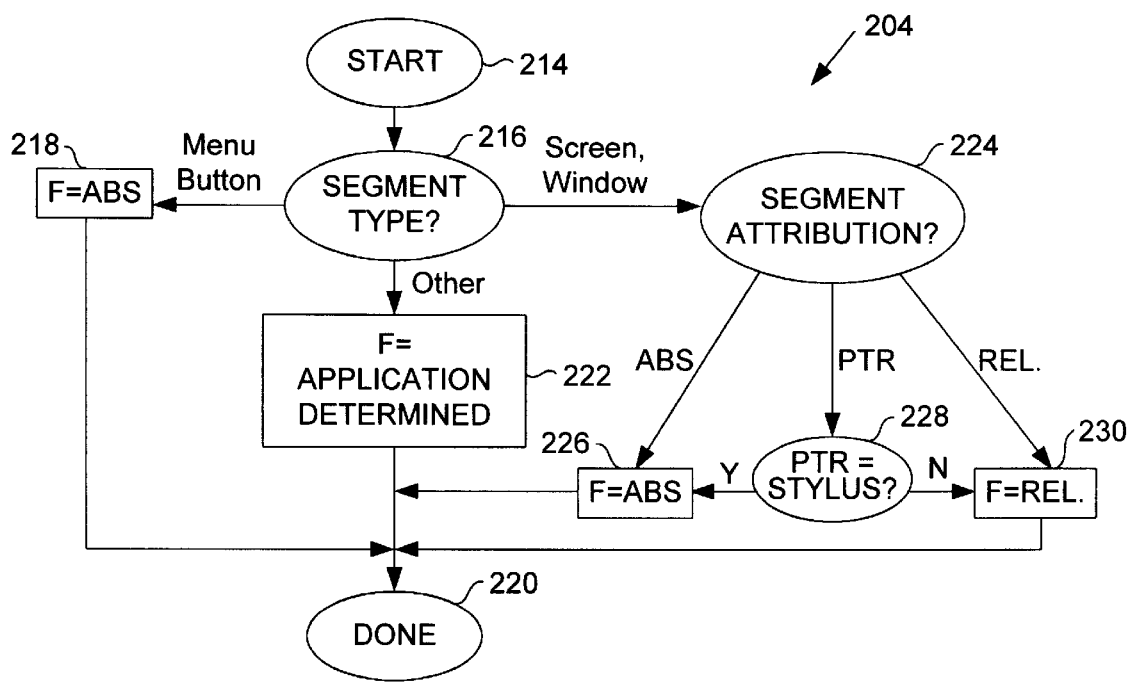
FIG. 8 is a flow-diagram of the "PRE-PROCESS LOCATION" step of FIG. 7.

In FIG. 8, the "PRE-PROCESS LOCATION" step 204 of FIG. 7 is illustrated in greater detail. The process 204 begins at 214 and, in a decision step 216, the segment type is determined. If the segment type is a "menu" or "button," a step 218 assigns the function F to "ABS", representing the "absolute-mode", and is assigned the "absolute" attribute. The process 204 is then completed as indicated at 220. If the segment type is "other," the function F is determined by the application program which defines the segment in a step 222, and the process is again completed as indicated at 220.

If the segment type is determined by step 216 to be a screen or window, a step 224 determines the segment attribute. If the segment attribution is absolute, a step 226 assigns the function F to "ABS." If the segment attribution is pointer related, a step 228 determines whether the input pointer being used is a stylus. If so, step 226 again assigns the function F to "ABS" and the process is completed at 220. If the pointer is not a stylus as determined by step 228, the function is assigned to REL for "relative-mode" in a step 230 and the process is completed at 220. Also, if the segment attribution step 224 determines that the segment is in relative-mode only, step 230 will assign the function F to "REL" and the process will be completed at 220.

In Table 1, below, the correlation between a tablet/screen segment "type" and its "attribute" is shown. It should be noted that types and attributes have, in some instances, been used herein almost synonymously. However, certain "types" can have one or more "attributes", as noted below.

TABLE 1

| Type | Attribute |
| --- | --- |
| Window | Relative or Absolute |
| Screen | Relative or Absolute |
| Menu | Absolute |
| Button | Absolute |
| Palette | Relative/Absolute |
| Appl. Specific | Relative/Absolute |

Figure 9:
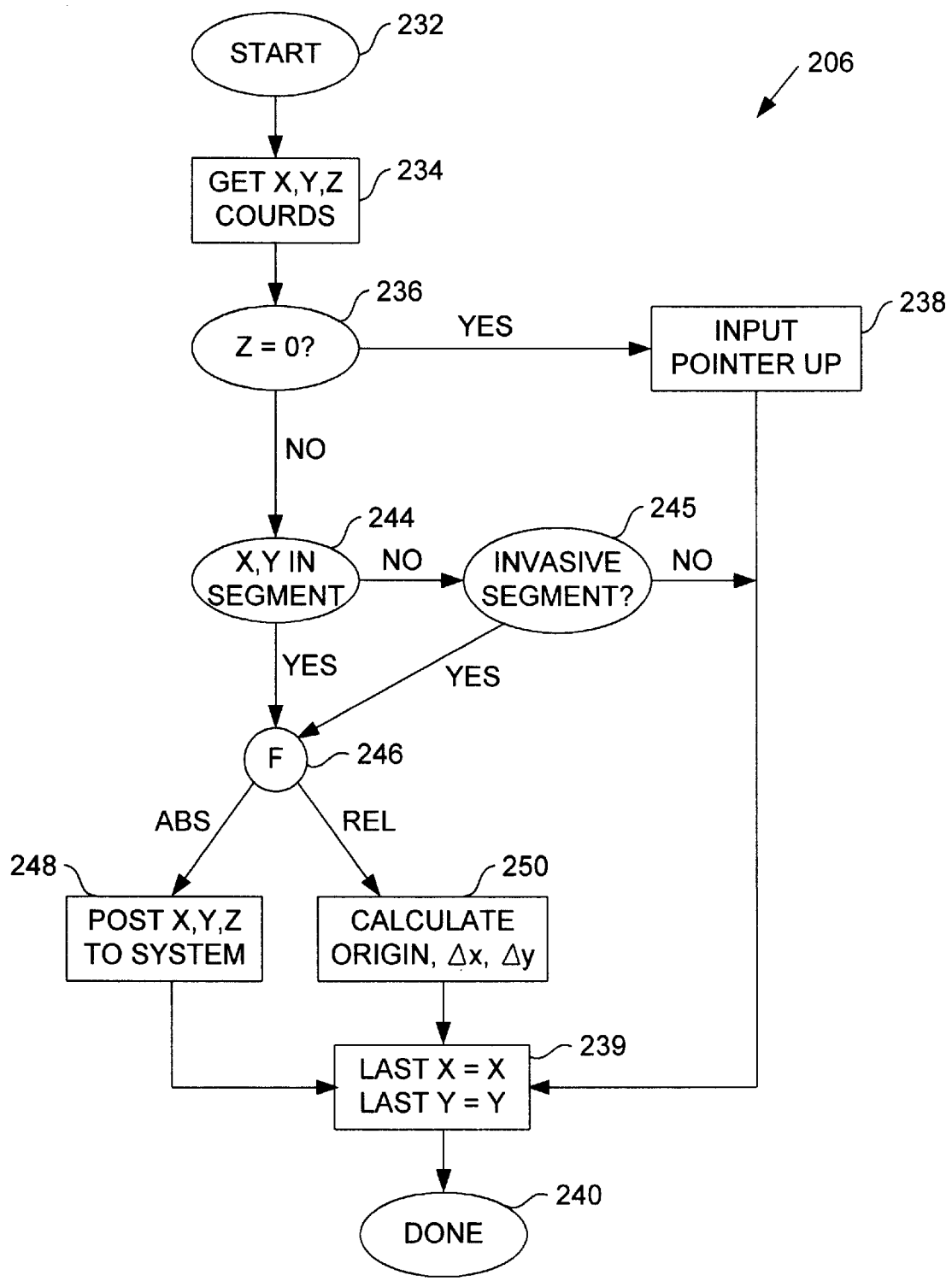
FIG. 9 is flow-diagram of a first embodiment of the "PROCESS LOCATION DATA" step of FIG. 7.

In FIG. 9, a first embodiment for the "PROCESS LOCATION" step 206 is illustrated. More particularly, in this embodiment, process 206 begins at 232 and, in a step 234, the coordinates {x, y, z} are obtained from the input tablet. Next, in a decision step 236, it is determined whether the z coordinate is 0. If it is, this means that the input pointer is no longer on the input tablet. In consequence, step 238 determines that the input pointer is up, and a step 239 saves the values x, y as LASTX and LASTY. The process is then completed as indicated at 240.

If z is not equal to zero (as determined by step 236), the pointer is on the tablet and a decision step 244 determines whether the x, y coordinate is in the segment. If not, a step 245 determines whether the segment is "invasive", i.e. whether the segment can be entered from a previous segment and yet continue to use the attribute of the previous segment. If not, step 239 saves LASTX and LASTY, and the process is completed as indicated in step 240. If the pointer is in the segment (as determined by step 244), or if the segment type is invasive (as determined by step 245), a step 246 determines whether the mode ("F") is absolute or relative. If it is in absolute-mode, a step 248 posts the coordinates {x, y, z } to the system. If it is in a relative-mode, a step 250 calculates the relative changes Δx, and Δy. After steps 248 and 250, the LASTX and LASTY are save in step 139, and the process is completed as indicated at 240.

Figure 9A:
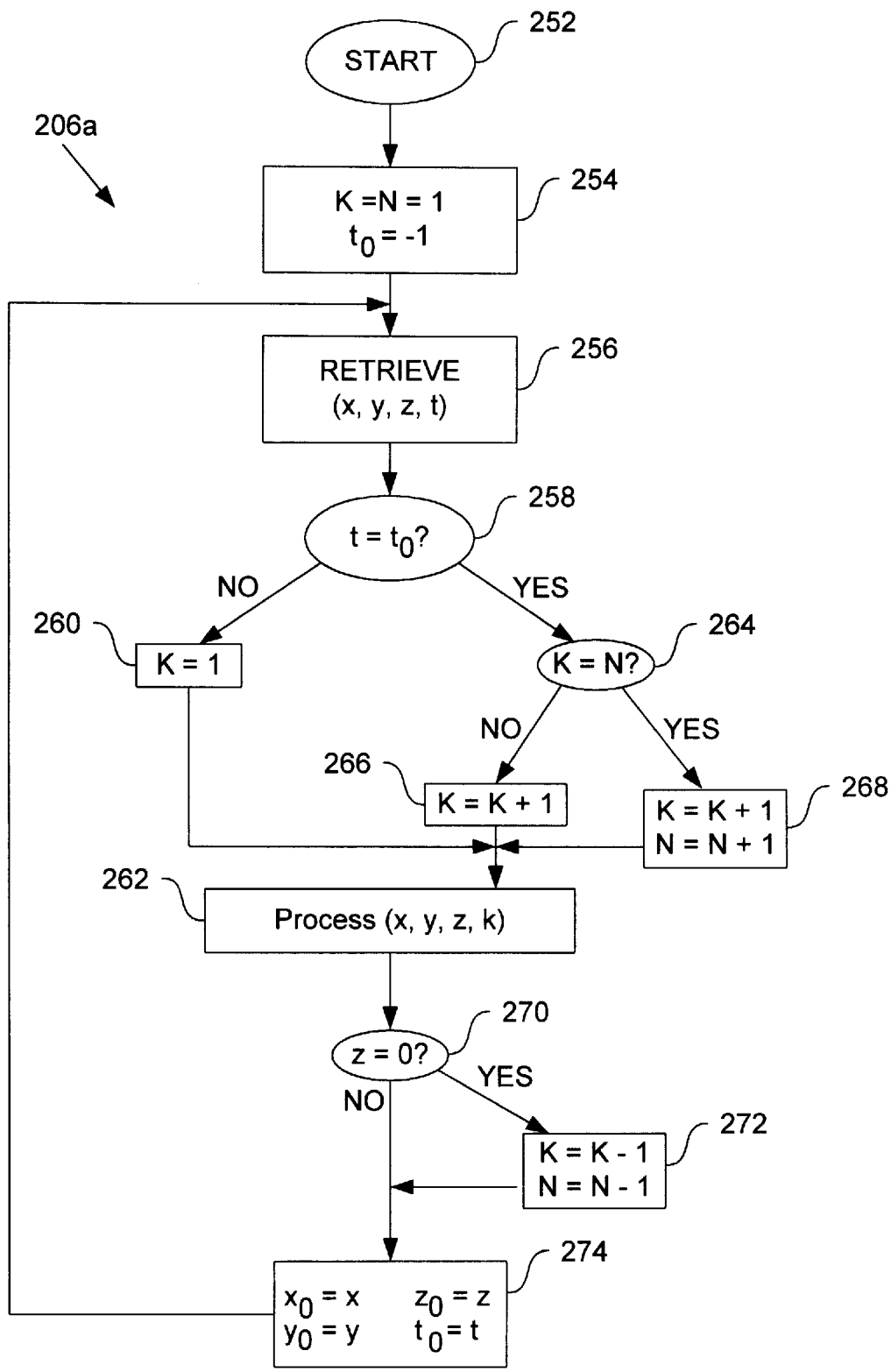
FIG. 9a is a flow-diagram of a second embodiment of the "PROCESS LOCATION DATA" step of FIG. 7.

FIG. 9a illustrates an alternate method 206a for step 206 of FIG. 7. This alternate method or process 206a handles the "multiple finger" problem. By "multiple finger," it is meant that multiple input pointers can be processed simultaneously on the surface of an input tablet.

In FIG. 9a, the process 206a begins at 252 and, in a step 254, the variables K and N are initialized to 1, and the variable to is initialized to −1. The variable K holds the current "finger" number, while the variable N holds the total number of "fingers." By "finger" it is, of course, meant finger, stylus, or other pointer on the tablet. Next, in a step 256, the parameters {x,y,z,t} are retrieved from the input tablet. Again, the "t" parameter is preferably any arbitrary, cyclical value which aids in the identification of multiple input pointers. The x,y,z parameters are "packets" of parameters or coordinates for each "finger" on the tablet.

In a decision step 258, the variable t is compared to $t_o$. If they are not the same, the variable K is set to 1 in a step 260. If $t=t_o$, a decision step 264 determines whether K=N. If not, the parameter K is incremented by one in a step 266. If K does equal N, step 268 increments both K and N, i.e. a new "finger" has been detected.

After the completion of any of steps 260, 266, and 268, a step 262 processes the coordinates x,y,z for the "finger" K (i.e. the coordinate packet for the Kth finger). Next, a step 270 determines whether z=0, i.e. whether the "finger" has been lifted from the tablet. If it has been lifted, a step 272 decrements both K (the current finger number) and N (the total number of fingers). Next, a step 274 assigns the variables $x_o$, $y_o$, $z_o$, $t_o$ with the values x, y, z, t, respectively after either the completion of step 272 or if z is not equal to zero as determined by step 270. Process control is then returned to step 256 to await further data from the tablet.

Figure 10:
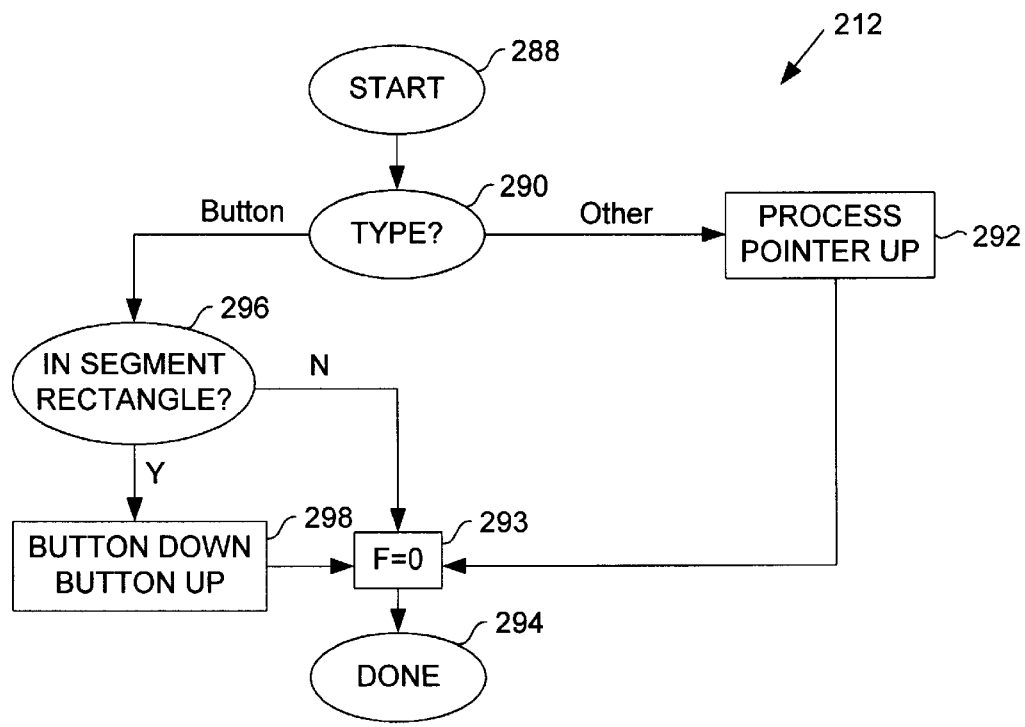
FIG. 10 is flow-diagram of the "POST-PROCESS LOCATION" step of FIG. 10.

In FIG. 10, the process of step 212 of FIG. 7 is illustrated in greater detail. More particularly, process 212 begins at 288 and, in a step 290 the type of segment being exited is determined. In the present embodiment, only two types need to be handled, namely button and "other." If step 290 determines that the type is "other", an input "pointer up" condition is processed in step 292 in a fashion well appreciated by those skilled in the art. The variable "F" is then set to zero in step 293, and the process is complete at 294. If, on the other hand, the step 290 determines that the type is "button", it is determined that a step 296 whether it is within a segment rectangle. If yes, a step 298 sends a "button down" and a "button up" signal to the system. Upon a negative determination of step 296 or after step 298 has been completed, the variable F is set to zero in step 293, and the process 212 is completed at 294.

While this invention has been described in terms of several preferred embodiments, there are alterations, permutations, and equivalents which fall within the scope of this invention. For example, a number of the processes of the present invention have been described as sequential logic, but can equally well be implemented using either hardware or software interrupt logic. It is therefore intended that the following appended claims be interpreted as including all such alterations, permutations, and equivalents as fall within the true spirit and scope of the present invention.

What is claimed is:

1. A method for processing input tablet data received from an input device, the method comprising:
    detecting a user supplied command to change a logical segmentation of a two dimensional tablet surface of a corresponding input tablet;
    changing said logical segmentation of said tablet surface in response to said command to include a first logical segment and a second logical segment;
    receiving coordinate data from said tablet surface responsive to a proximal positioning of an input pointer with respect to said tablet surface;
    processing said coordinate data in a relative mode when said coordinate data corresponds to entries received from the input device on said first logical segment of said tablet surface; and
    processing said coordinate data in an absolute mode when said coordinate data corresponds to entries received from the input device on said second logical segment of said tablet surface.

2. A method for processing input tablet data as recited in claim 1 wherein said step of processing of said coordinate data in said relative-mode includes calculating x-y positional change data of a first proximal position within said first segment relative to a second proximal position within said first segment, and wherein said step of processing of said coordinate data in said absolute-mode includes a one to one mapping of said coordinate data associated with said second segment to said position of said input device upon said tablet surface.

3. A computer system as recited in claim 1 wherein:
    said data is received by the data processor from both said first logical segment and said second logical segment in absolute-mode, and wherein data received from said first logical segment is converted into relative-mode data by said data processor.

4. A method for processing input tablet data as recited in claim 1 wherein if said command is received during a start-up of said data processor, said logical segmentation of said tablet surface is determined by stored defaults.

5. A method for processing input tablet data as recited in claim 1 comprising sending a query to a user and detecting said command from said user in response to said query.

6. A method for processing input tablet data as recited in claim 1 wherein said command is provided by an application program.

7. A method for processing input tablet data as recited in claim 2 further comprising the step of:
    initializing said tablet such that said tablet provides said coordinate data in an absolute-mode.

8. A method for processing input tablet data as recited in claim 7 wherein said initializing step includes patching of a relative-mode routine of said input tablet.

9. A method for processing input tablet data as recited in claim 2 wherein said step of processing said coordinate data in said relative-mode includes sending control signals to a display screen capable of displaying a pointer image such that said pointer image operates in said relative-mode.

10. A method for processing input tablet data as recited in claim 9 wherein said step of processing said coordinate data in said absolute-mode further includes:
    sending control signals to said display screen such that said pointer image is manipulated in said absolute-mode when displayed at a position on said screen that corresponds to an associated position on said tablet surface when said second segment is said absolute-mode portion; and
    sending button commands when said second segment is an absolute-mode button segment.

11. A method for processing input tablet data as recited in claim 10 wherein said processing of said coordinate data in said relative-mode includes processing said coordinate data received from said first segment in said relative-mode regardless of said type of said input pointer, and wherein said step of processing said coordinate data in an absolute-mode includes processing said coordinate data received from said second segment in said absolute-mode regardless of said type of said input pointer.

12. A method for processing input tablet data as recited in claim 10 including processing said coordinate data in different manners according to said type of input pointer used.

13. A method of processing input tablet data as recited in claim 10 including processing coordinate data from a segment in one of said relative and absolute-modes when said input pointer is said first type of input pointer, and processing coordinate data from said same segment such that said coordinate data is ignored when said input pointer is said second type of input pointer.

14. A method of processing input tablet data as recited in claim 2 including:
    receiving coordinate data substantially simultaneously from at least two separate segments; and
    processing said simultaneously received coordinate data.

15. A method of processing input tablet data as recited in claim 10, wherein said second type of input pointer includes a palm.

16. An input tablet configurator for use in conjunction with a computer system having a tablet surface for receiving inputs to a processor, the tablet surface being responsive to a proximal positioning of an input pointer placed upon the tablet surface by producing coordinate data which is sent to a data processor, the input tablet configurator comprising:

a machine readable medium, and program instructions stored in said machine readable medium, said program instructions including:

means for detecting a user supplied command to change a logical segmentation of the tablet surface to include a first logical segment and a second logical segment; wherein said first logical segment operates such that when said input device is positioned in said first logical segment said coordinate data is processed in a relative mode and wherein said second logical segment operates such that when said input device is positioned in said second logical segment said coordinate data is processed in a absolute mode;

means for changing said logical segmentation of said tablet surface to include said first logical segment and said second logical segment in response to said command; and means for changing said operation of said first logical segment from said relative mode to said absolute mode and for changing said operation of said second logical segment from said absolute mode to said relative mode in response to said user supplied command.

17. An input tablet configurator as recited in claim 14 wherein said means for changing said mode include means for setting said mode of said entire tablet surface into one of an absolute-mode and a relative-mode.

18. An input tablet configurator as recited in claim 16 wherein said means for changing said mode include means for setting said mode of at least one first segment of said tablet surface into said relative-mode and for setting said mode of at least one second segment of said tablet surface into said absolute-mode.

19. An input tablet configurator as recited in claim 18 wherein said at least one second segment includes one of an absolute-mode mapping segment and an absolute-mode button segment.

20. An input tablet configurator as recited in claim 18 wherein said at least one second segment includes at least one absolute-mode mapping segment and at least one absolute-mode button segment.

21. A computer system comprising:

an input pointer;

a display screen capable of displaying images;

a tablet having a two dimensional tablet surface operative to produce coordinate data in response to a proximal positioning of said input pointer relative to said tablet surface wherein when a user supplied command to change the logical segmentation of the two dimensional tablet surface is detected, said logical segmentation of said tablet surface is changed to include a first logical segment and a second logical segment in response to said command; and a data processor coupled to said tablet and the display screen and operative to receive said coordinate data from the tablet and send associated display information to the display screen, said data processor being arranged to process said coordinate data received from the tablet such that coordinate data corresponding to said first logical segment of said tablet is processed in a relative mode, and coordinate data corresponding to said second logical segment of said tablet is processed in an absolute mode.

22. A computer system as recited in claim 3 wherein said display screen is capable of displaying a pointer image under the control of said data processor, wherein a position of said pointer image on said screen is controlled in a relative-mode fashion when the coordinate data corresponds to said first portion of the display screen, and is controlled in an absolute-mode when the coordinate data corresponds to said second portion of the display screen.

23. A computer system as recited in claim 22 wherein said tablet provides said data to said data processor in an absolute-mode regardless of the position of said pointer mechanism on said tablet.

24. A method of processing input tablet data as recited in claim 23 including processing coordinate data from a segment in one of said relative and absolute-modes when said input pointer is said first type of input pointer, and processing coordinate data from said same segment such that said coordinate data is ignored when said input pointer is said second type of input pointer.

25. A method of processing input tablet data as recited in claim 24, wherein said second type of input pointer includes a palm.

* * * * *